(12) United States Patent
Aoki et al.

(10) Patent No.: US 7,626,607 B2
(45) Date of Patent: Dec. 1, 2009

(54) 3-DIMENSIONAL IMAGE DISPLAY DEVICE AND 3-DIMENSIONAL IMAGE DISPLAY EQUIPMENT

(75) Inventors: Hiroyuki Aoki, Saitama (JP); Katsunari Yokota, Saitama (JP); Yukinori Kawaguchi, Saitama (JP); Toshihiko Kamio, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 770 days.

(21) Appl. No.: 10/449,064

(22) Filed: Jun. 2, 2003

(65) Prior Publication Data

US 2003/0227541 A1    Dec. 11, 2003

(30) Foreign Application Priority Data

Jun. 4, 2002    (JP)    ............................ 2002-163330

(51) Int. Cl.
*H04N 9/47* (2006.01)
*G09G 5/00* (2006.01)

(52) U.S. Cl. ............................................. 348/58; 345/7

(58) Field of Classification Search ................... 348/58, 348/51, 42, 44, 36, 47, 52, 54, 43, 46, 53, 348/55, 48, 56, 57, 59, 60, 121, 122, 123, 348/124; 375/240.01; 345/1.2, 1.1, 1.3, 345/4, 5, 7, 8, 156, 158, 145, 146
See application file for complete search history.

(56) References Cited

U.S. PATENT DOCUMENTS

| | | | | |
|---|---|---|---|---|
| 5,502,484 A | * | 3/1996 | Okada | ..................... 348/208.6 |
| 5,574,836 A | * | 11/1996 | Broemmelsiek | ............. 395/127 |
| 6,278,418 B1 | * | 8/2001 | Doi | ................................ 345/7 |
| 6,937,209 B1 | * | 8/2005 | Nagata et al. | ................ 345/1.1 |
| 2001/0024231 A1 | * | 9/2001 | Nakamura et al. | ............ 348/58 |
| 2004/0075906 A1 | * | 4/2004 | Sedlmayr | .................... 359/497 |

FOREIGN PATENT DOCUMENTS

JP    2000-330709 A    11/2000

OTHER PUBLICATIONS

Paul Rajlich, The Cave Environment, May 1998, 4.*

* cited by examiner

*Primary Examiner*—Behrooz Senfi
(74) *Attorney, Agent, or Firm*—Birch, Stewart, Kolasch & Birch, LLP

(57) ABSTRACT

To contrive a reduction in the overall size of the device in the case of arranging at least two screens, to reduce color shading of a 3-dimensional image, and thereby to give a further absorbedness feeling to the viewer. A 3-dimensional image display device includes a space partitioned by a frame assembled in a box shape, the space accommodating a plurality of viewers, three screens disposed so as to partition the space, three projectors disposed correspondingly to the screens, respectively, and a controller for supplying image data to the projectors and further includes a phase plate disposed between the first projector and the front screen, and further, a phase plate disposed between the third projector and a reflective mirror member.

26 Claims, 12 Drawing Sheets

114

3-DIMENSIONAL IMAGE DISPLAY DEVICE AND 3-DIMENSIONAL IMAGE DISPLAY EQUIPMENT

BACKGROUND OF THE INVENTION

CROSS-REFERENCE TO RELATED APPLICATIONS

The present nonprovisional application claims priority under 35 USC 119 to Japanese Patent Application No. 2002-163330 filed on Jun. 4, 2002 the entire contents thereof is hereby incorporated by reference.

1. Field of the Invention

The present invention relates to a 3-dimensional image display device and 3-dimensional image display equipment in which an image for a 3-dimensional display, for example, an image having different parallaxes to the left and right eyes of the viewer is projected from an image projector onto a screen, whereby a 3-dimensional image can be shown to the viewer.

2. Description of Background Art

In the case of realizing a 3-dimensional vision by use of an image projector, the 3-dimensional vision can be realized by projecting an image for a 3-dimensional display, for example, an image having different parallaxes to the left and right eyes of the viewer from the image projector onto a screen.

The 3-dimensional vision is deemed to be promising since, for example, the evaluation of the shape of a vehicle body or a component part or the like can be performed by use of a virtual object (a real-size model or the like) without producing a real object.

At present, specific examples of a system for realizing 3-dimensional vision includes the so-called wall type in which an image is projected onto a large-sized screen, and the so-called box type in which a screen is installed in one closed space and an image is projected onto the screen.

In the case of evaluation of a model according to the wall type, for example, the viewer is seated on a chair or the like to fix the position of the viewer, and a projected image is moved, whereby the evaluation is conducted. In this case, since the screen size can be set to be large, the image of one model, for example, is projected by a plurality of image projectors. When the model is of a comparatively small-size, such as a motorcycle, a life-size image can be projected by use of one image projector.

The components of the wall type system include a large-sized screen, one or a plurality of image projectors disposed behind the screen, and a liquid crystal shutter spectacles or the like worn on the viewer.

On the other hand, in the box type 3-dimensional image display device, an image corresponding to the position of the viewer is instantaneously computed and projected (see, for example, Japanese Patent Laid-open No. 2000-330709), and it is possible for the viewer himself to move around the model for the purpose of evaluation.

The components of the box type system include a room constituting the closed space, one image projector for projecting an image onto a screen, liquid crystal shutter spectacles or the like worn on the viewer, and a position sensor for detecting the position of the viewer.

The box type is optimum for the designing or evaluation of a vehicle body or the like because the viewer of the model can confirm the model while moving around, although it is necessary to secure a wider installation space than that in the case of the wall type.

Meanwhile, in the box type 3-dimensional image display device, it may be contemplated to increase the number of screens, to thereby secure a wider field of view, and to ensure that the model can be evaluated from all directions. In addition, the widening of the field of view increases the absorbedness feeling of the viewer.

In this case, it may be considered to install a plurality of image projectors in the closed space. However, in order to project an image onto substantially the whole region of each screen, it is necessary to secure a large distance between the screen and the image projector, leading to a problem wherein the closed space needs to be large in size; in addition, there is the fear of color shading. Besides, when screens are arranged facing the ceiling and the floor of the closed space, it is difficult to install the image projectors opposite to the screens.

Meanwhile, when the 3-dimensional image display device is contained in a mobile body so that the 3-dimensional image display device can be transported, it is possible to contribute to the popularization of the equipment by using the 3-dimensional image display device. However, since it is necessary to enlarge the closed space in size as above-mentioned, it is impossible at present to contain the 3-dimensional image display device in a mobile body.

OBJECTS AND SUMMARY OF THE INVENTION

The present invention has been made in consideration of the above circumstances. Accordingly, it is an object of the present invention to provide a 3-dimensional image display device by which it is possible to contrive a reduction in the overall size of the device in the case of installing at least two screens, to reduce color shading of the 3-dimensional image, and to give a further absorbedness feeling to the viewer.

It is another object of the present invention to provide 3-dimensional image display equipment by which it is possible to produce a 3-dimensional image in a limited space in a mobile body such as a vehicle.

In accordance with one aspect of the present invention, there is provided a 3-dimensional image display device comprising at least two image projectors, at least two screens disposed correspondingly to the at least two image projectors for projecting thereon images from the image projectors, and a controller for outputting image data for the 3-dimensional display corresponding respectively to the screens to the at least two image projectors, wherein the 3-dimensional image display device comprises a first projection system for projecting an image from the image projector directly onto the screen, and a second projection system for projecting an image from the image projector onto the screen through reflection by a reflective member, and comprises at least one set in which a polarizing means is disposed between the image projector and the screen.

First, since the reflective member is present between the image projector and the screen, it is possible, for example, to install the image projector in the vicinity of the screen. Namely, since it is possible to earn the virtual distance of the optical path by reflecting the light emitted from the image projector and projecting the reflected light onto the screen, the image can be projected to substantially the whole region of the screen even if the image projector is disposed in the vicinity of the screen.

This is advantageous for reducing the installation space of at least two screens and at least two image projectors that makes it possible, for example, to reduce the size of a closed space in the case where the screens and the image projectors are installed in the closed space. As a result, it is possible to dispose the screens and the image projectors in a limited space in a mobile body such as a vehicle.

In addition, the provision of the second projection system is advantageous for reducing the installation space of at least two screens and at least two image projectors, making it possible, for example, to reduce the size of a closed space in the case of installing the screens and the image projectors in the closed space.

Meanwhile, where the first projection system not comprising a reflective member and the second projection system comprising the reflective member are mixed together, the harmony of linearly polarized light components (vibration directions of longitudinal and lateral waves) of the image projected on each screen may not be secured, and color shading may appear.

However, in the present invention, at least one set comprising the polarizing means disposed between the image projector and the screen is provided, so that it is possible to adjust all the linearly polarized light components of the image projected on each screen, and the problem of color shading is solved.

In the present invention, the polarizing means may be disposed between the image projector and the screen in the first projection system or the second projection system.

Here, where it is assumed, for example, that an image of linearly polarized light is emitted from the image projector, in the first projection system the image of the linearly polarized light, for example, from the image projector is projected directly onto the screen, whereas in the second projection system the image of the polarized light, for example, from the image projector is once reflected by the reflective member to be an image of elliptically polarized light, for example, and the image of the elliptically polarized light is projected onto the screen.

Therefore, when a 3-dimensional image is formed under this condition, the harmony of the polarized light components may not be secured, and color shading may occur.

However, in the present invention, the polarizing means is arranged in the first projection system or the second projection system. For example, by providing the polarizing means for converting, for example, linearly polarized light emitted from the image projector into, for example, elliptically polarized light, the harmony of the polarized light components is secured and the problem of color shading is solved.

Where the polarizing means is arranged in the second projection system, it may be considered to dispose the polarizing means between the image projector and the reflective means or between the reflective means and the screen. Where the polarizing means is disposed between the image projector and the reflective means, it is preferable to dispose such a polarizing means that the image light transmitted through the polarizing means is converted into linearly polarized light by the reflective means. Where the polarizing means is disposed between the reflective means and the screen, it is preferable to dispose such polarizing means that the image light of the elliptically polarized light reflected on the reflective means is converted into linearly polarized light.

In the present invention as above, it is preferable that the controller outputs image data for 3-dimensional display according to the positions of the screen and the viewer. First, since at least two screens are present, the field of view is enlarged, and the absorbedness feeling is increased. In addition, since the 3-dimensional image according to the position of the viewer is displayed, the 3-dimensional image can be appreciated (evaluated) from substantially all directions.

In accordance with another aspect of the present invention, there is provided a 3-dimensional image display equipment comprising a mobile body having a closed space, and a 3-dimensional image display device disposed in the closed space of the mobile body, wherein the 3-dimensional image display device comprises at least two image projectors, at least two screens disposed correspondingly to the at least two image projectors for projecting thereon images from the image projectors, and a controller for outputting image data for the left and right eyes according respectively to the screens to the at least two image projectors.

By this, the 3-dimensional image display device capable of producing a 3-dimensional image can be contained in the closed space of the mobile body and be thereby transported; therefore, in the case of performing an evaluation or presentation by use of a 3-dimensional image of a model at a designing stage, for example, the evaluation or presentation can be conducted in any place. This leads to the merits that corrections at the designing stage of a product can be performed early, and the building of design specifications taking the opinions of the users into account can be conducted early. Besides, it is possible to perform a demonstration at a site where the commercial product is actually used, and this is advantageous for enhancing the customer attractiveness of the commercial product and the customers' interest in the commercial product.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, embodiments of a 3-dimensional image display device and a 3-dimensional image display equipment according to the present invention will be described below referring to FIGS. 1 to 12.

Figure 1:
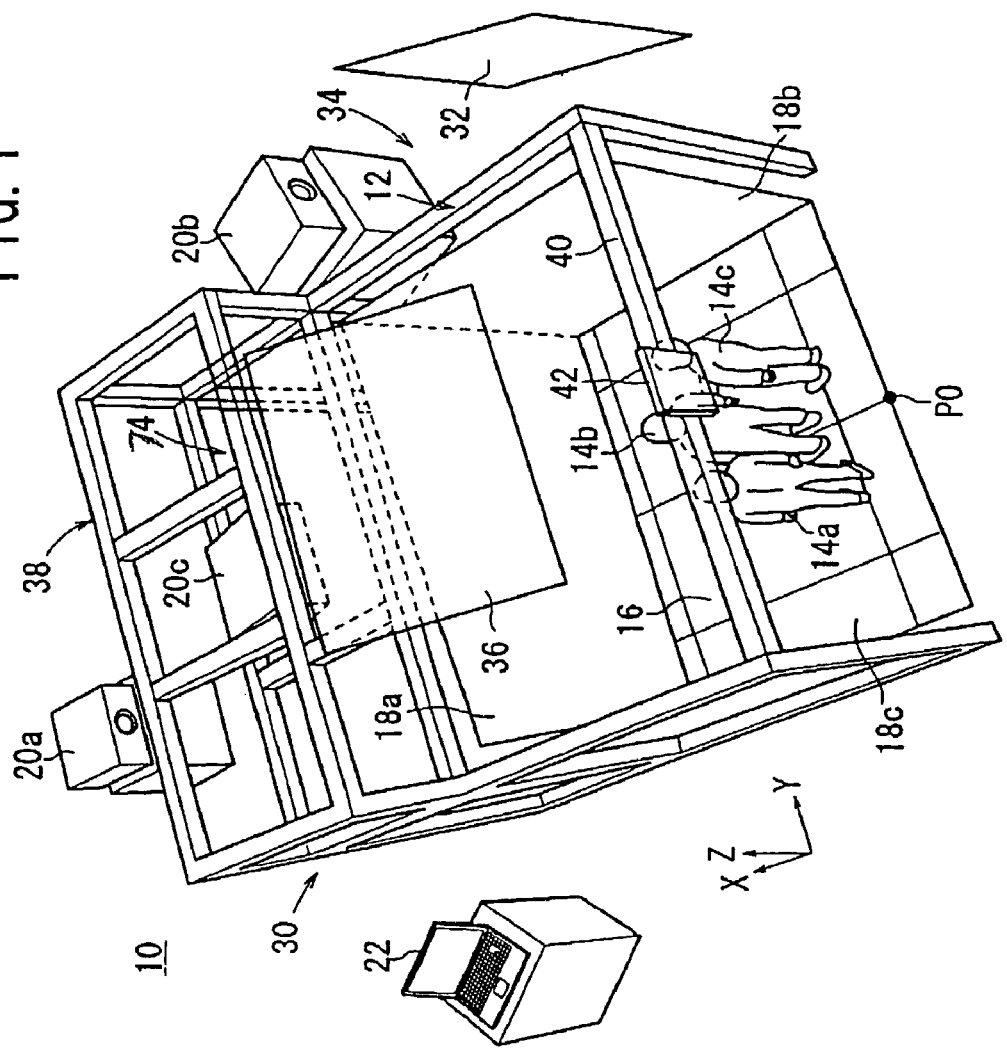
FIG. 1 is a perspective view of a 3-dimensional image display device according to one embodiment of the present invention.
Figure 2:
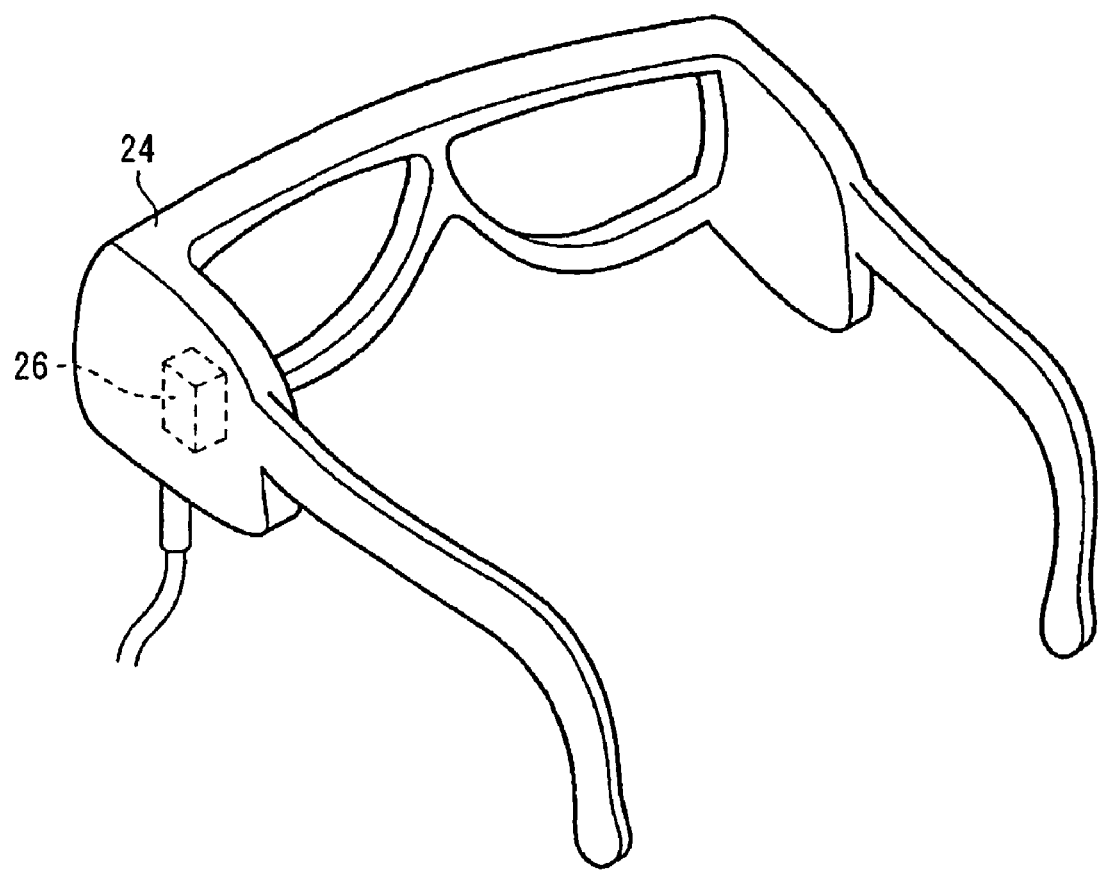
FIG. 2 is a perspective view showing one example of liquid crystal shutter spectacles.
Figure 3:
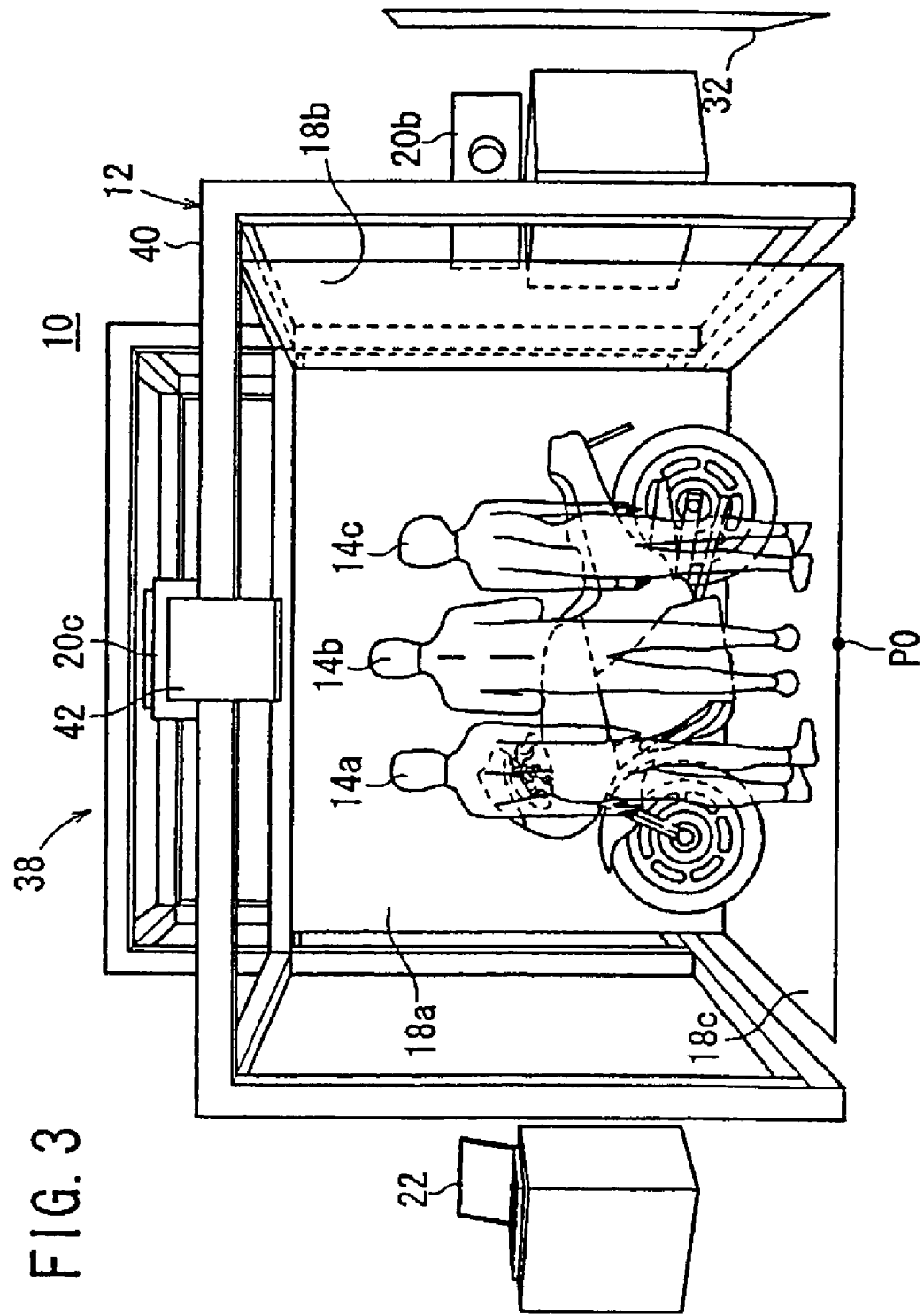
FIG. 3 is a front view of the 3-dimensional image display device according to the embodiment.

First, as shown in FIGS. 1 and 3, the 3-dimensional image display device 10 according to the present embodiment comprises a space 16 which is partitioned by a frame 12 assembled in a box shape and in which a plurality of viewers 14 (14a to 14c) are positioned. Three screens 18a, 18b and 18c are disposed so as to partition the space 16, three image projectors (hereinafter referred to simply as projectors) 20a, 20b and 20c are disposed correspondingly to the screens 18a, 18b and 18c. A controller 22 is provided for supplying image data to the projectors 20a, 20b and 20c. Liquid crystal shutter spectacles 24 (see FIG. 2) are worn on the viewers 14. The liquid crystal shutter spectacles 24 are fitted with a magnetic-type position sensor 26.

Of the three screens 18a, 18b and 18c, one is disposed on a front surface of the space 16, one is disposed on a side surface of the space 16, and one is disposed on the floor surface, and they are each fixed to the frame 12.

In this embodiment, a first projection system in which an image is projected from the projector directly onto the screen and a second projection system in which an image is projected from the projector onto the screen through reflection by a reflective mirror member are provided.

More specifically, the first projector 20a is disposed behind the front screen 18a so that the image from the first projector 20a is projected directly onto the front screen 18a; this arrangement constitutes the first projection system 30.

The second projector 20b is arranged in the vicinity of the boundary portion between the front screen 18a and the side screen 18b, and further, a reflective mirror member 32 is disposed behind the side screen 18b so that the image from the second projector 20b is projected onto the side screen 18b through reflection on the reflective mirror member 32; this arrangement constitutes the second projection system 34.

The third projector 20c is disposed in the vicinity of an upper portion of the front screen 18a, and further, a reflective mirror member 36 is arranged at a ceiling portion of the space 16 so that the image from the third projector 20c is projected onto the floor screen 18c through reflection on the reflective mirror member 36; this arrangement constitute the third projection system 74.

Incidentally, the third projector 20c is fixed to a projector-installing frame 38 disposed behind the frame 12 partitioning the space 16, and the reflective mirror member 36 is also fixed to the frame 38 at a predetermined angle.

In addition, a magnetic field generator 42 for generating a magnetic field to be sensed by the position sensors 26 (see FIG. 2) is fixed to one beam 40 of the frame 12 partitioning the space 16 so that the positions of the plurality of viewers 14 are respectively detected based on information from the position sensors 26 on the liquid crystal shutter spectacles 24 worn on the viewers 14.

Figure 4:
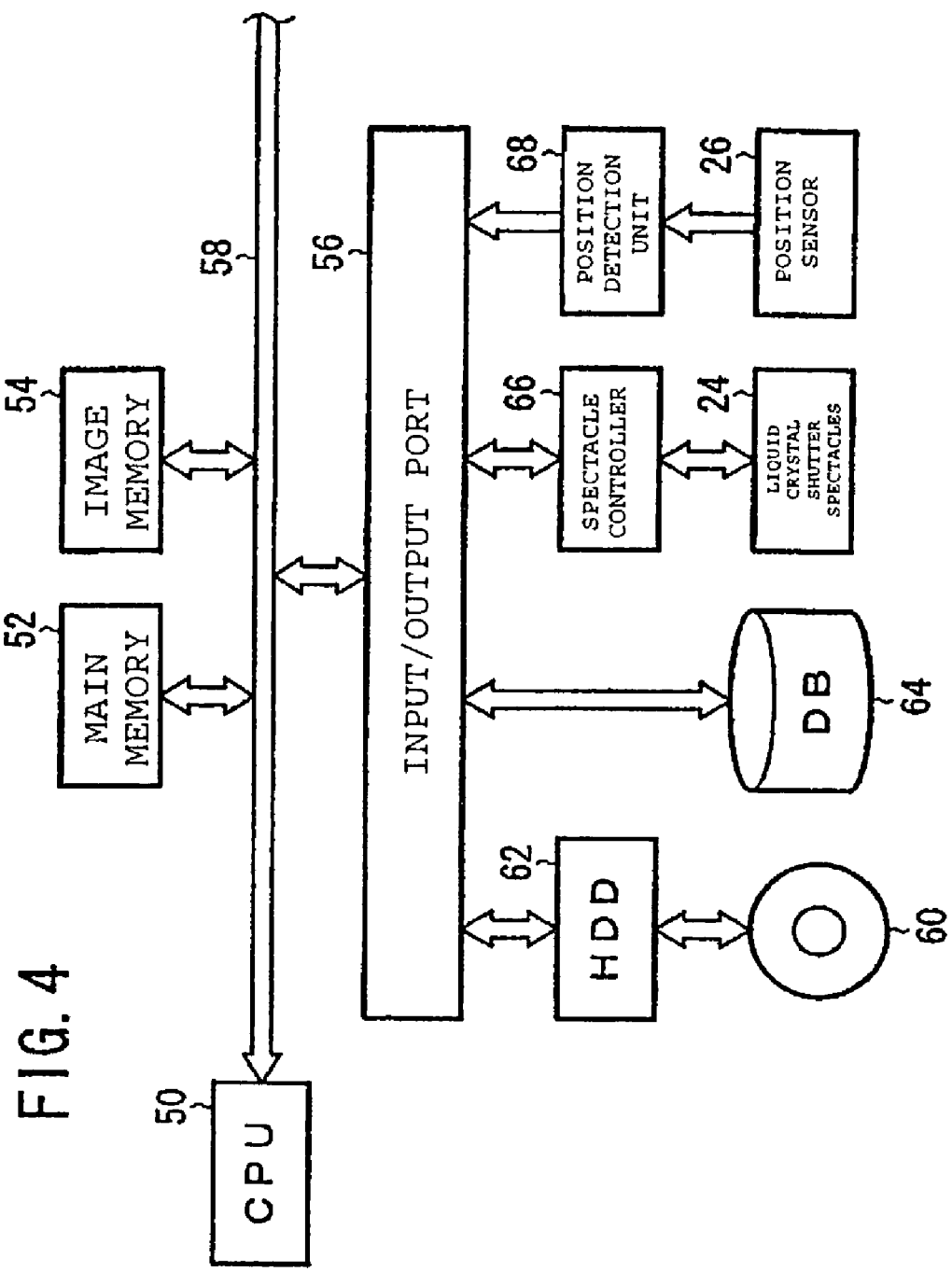
FIG. 4 is a block diagram showing the constitution of a controller in the 3-dimensional image display device according to the embodiment.

As shown in FIG. 4, the controller 22 comprises a CPU 50 for executing various programs, a main memory 52 used as a program-executing area and a data storage area, an image memory 54 in which image data according to the positions of the screens 18a, 18b and 18c and the viewers 14 are drawn, and an input/output port 56 for inputting and outputting data in relation to external apparatuses. The CPU 50, the main memory 52, the image memory 54 and the input/output port 56 are connected through a system bus 58.

A hard disk drive 62 for performing data access to a hard disk 60 is used for the storage of programs and data and as a virtual storage region, a data base 64 in which CAD data and texture data of models to be displayed in the form of 3-dimensional images are registered, a spectacle controller 66 for controlling the liquid crystal shutter spectacles 24, and a position detection unit 68 for receiving detected values from the position sensors 26, are connected to the input/output port 56.

Here, of the surface (back surface) opposed to the front screen 18a, the point opposed to the center point of the lower end of the front screen 18a is made to be an origin point P0, for example the direction orthogonal to the plane of the front screen 18a is made to be an X direction, the direction from the origin point P0 toward the side screen 18b is made to be a Y direction, and the direction from the origin point P0 toward the ceiling is made to be a Z direction. Then, the detected values supplied from the position sensors 26 include the detected values in these three axial directions.

Next, the image data processing means 80 as software to be executed by the controller 22 will be described referring to FIG. 5. The image data processing means 80 has the function of forming image data for a 3-dimensional display according respectively to the screens 18a, 18b and 18c and outputting the image data to the projectors 20a, 20b and 20c.

Figure 5:
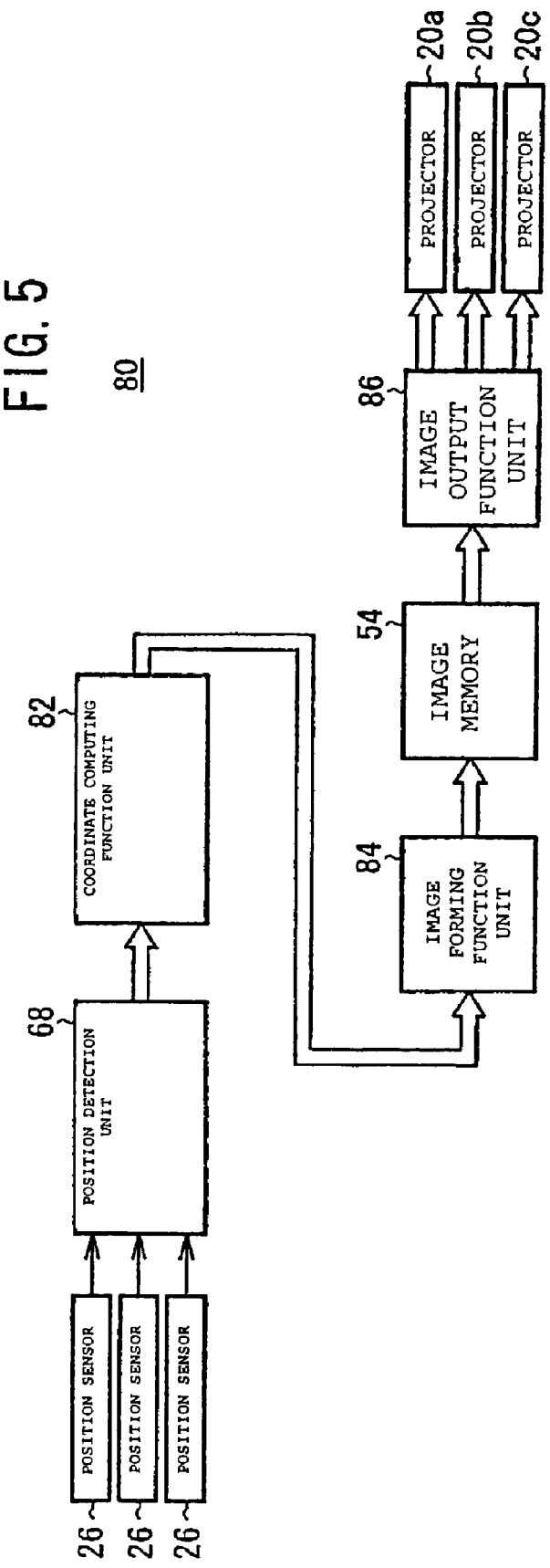
FIG. 5 is a functional block diagram showing the constitution of an image data processing means performed in the controller.

As shown in FIG. 5, the image data processing means 80 comprises a coordinate computing function unit 82 for receiving the detected values from each of the position sensors 26 through a position detection unit 68 and obtaining the positions (coordinates) of the eyes of each of the viewers 14, an image forming function unit 84 for forming image data according respectively to the screens 18a, 18b and 18c and according to the positions (coordinates) of the eyes of each of the viewers 14, which are to be outputted to the first to third projectors 20a, 20b and 20c, and drawing the image data in the image memory 54, and an image output function unit 86 for outputting the image data drawn in the image memory 54 to the corresponding projectors 20a, 20b and 20c.

Here, the procedure in the image data processing means 80 will be described referring to FIGS. 6 and 7.

Figure 6:
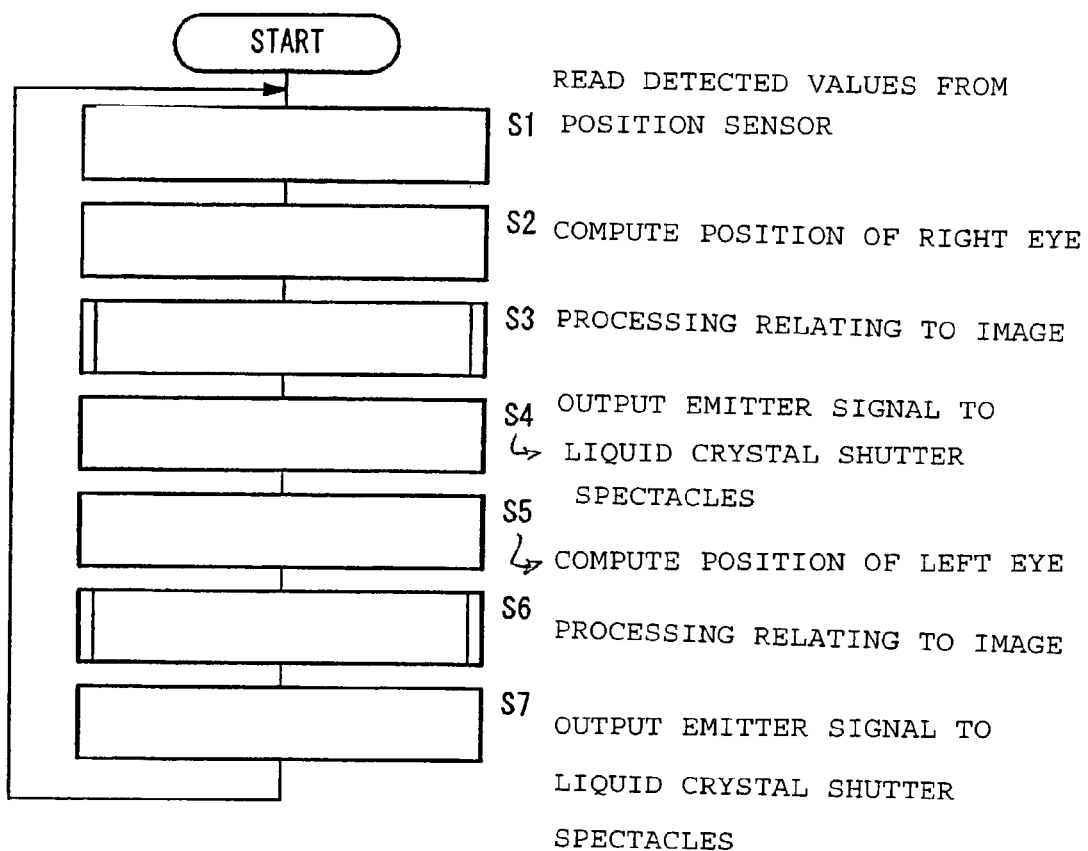
FIG. 6 is a flow chart (No. 1) of the procedure of the image data processing means.
Figure 7:
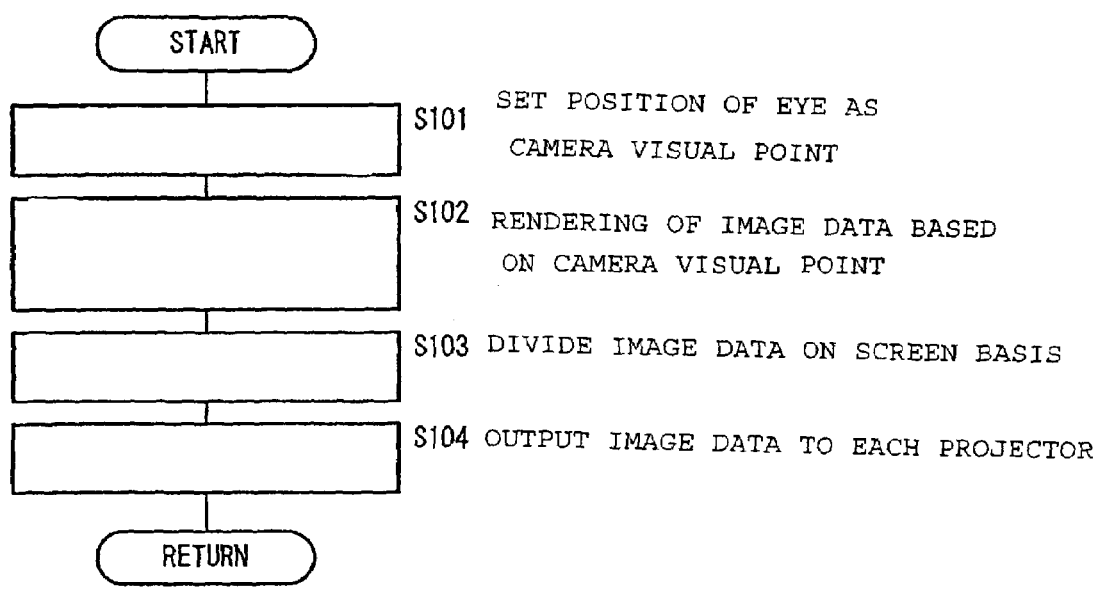
FIG. 7 is a flow chart (No. 2) of the procedure of the image data processing means.

First, in step S1 in FIG. 6, the CPU 50 reads detected values from the position sensor 26 through the position detection unit 68. Thereafter, in step S2, the coordinate computing function unit 82 obtains the position (coordinates) of, for example, the right eye based on the detected values.

Next, in step S3, a processing relating to an image is entered. First, in step S101 in FIG. 7, the image forming function unit 84 is inputted with the position of the eye obtained by the coordinate computing function unit 82 as coordinates of a camera visual point.

Thereafter, in step S102, the image forming function unit 84 computes image data based on the camera visual point, of the image data of an object to be displayed, and draws the computed image data in the image memory 54 (rendering). Thereafter, in step S103, the image output function unit 86 divides the drawn image data on a screen basis, and in step 104, outputs the image data to each of the projectors 20a to 20c. Namely, by the processing in step S3 in FIG. 6, the image data relating to the right eye is projected to each of the screens 18a to 18c.

Next, in step S4 in FIG. 6, the CPU 50 outputs an emitter signal to the liquid crystal shutter spectacles 24 through a spectacle control unit 66.

Thereafter, in step S5, the coordinate computing function unit 82 obtains the position (coordinates) of the left eye based on the detected values (the detected values read in step S1). Thereafter, in step S6, a processing relating an image is entered, and the image data relating to the left eye are projected on each of the screens 18a to 18c.

Next, in step S7, the CPU 50 outputs an emitter signal to the liquid crystal shutter spectacles 24 through the spectacle control unit 66.

The procedure from step S1 to step S7 as above-mentioned is executed for each of the viewers 14a to 14c, whereby a 3-dimensional image according to the positions of the eyes of each of the viewers 14a to 14c can be shown to each of the viewers 14a to 14c, respectively.

Meanwhile, where the first projection system 30 not comprising the reflective mirror members 32 and 36 and the second projection systems 34 comprising the reflective mirror members 32 and 36 are mixedly provided, as in this embodiment, the harmony of the linearly polarized light components (vibration directions of longitudinal and lateral waves) of the image projected on each of the screens 18a, 18b and 18c may not be secured, and color shading may appear.

Figure 8A:
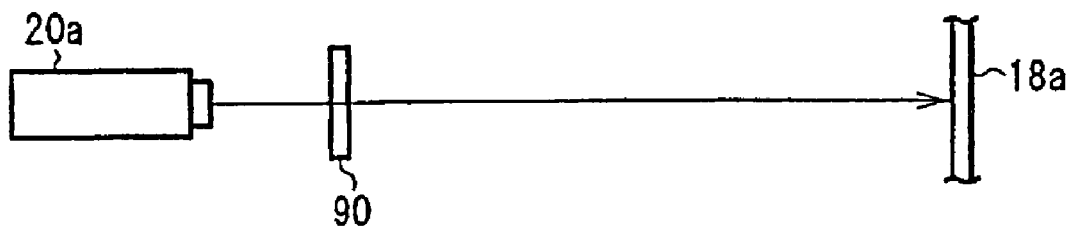
FIGS. 8A to 8C are illustrations of examples in which a phase plate is disposed between a first projector and a front screen and between a third projector and a reflective mirror member.
Figure 8B:
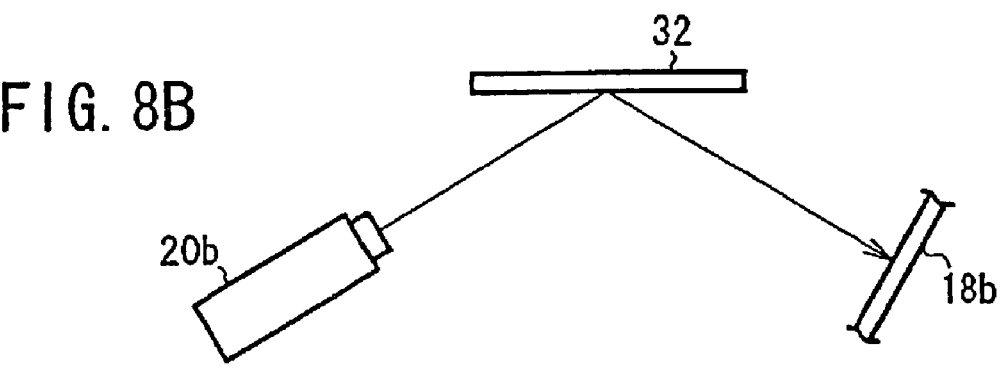
Figure 8C:
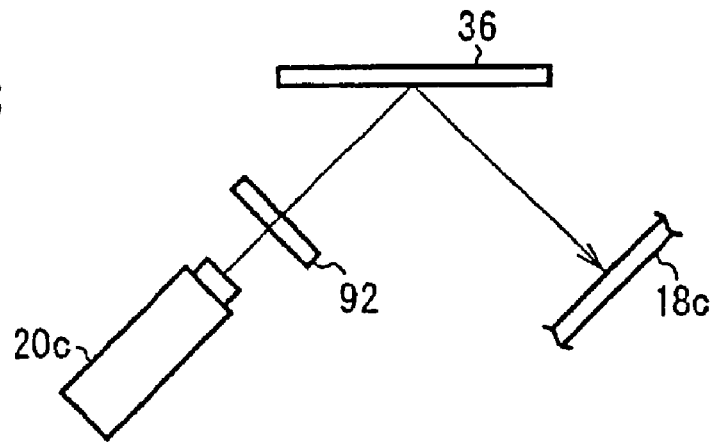

In view of this, in this embodiment, as shown in FIGS. 8A to 8C, a phase plate 90 is disposed between the first projector 20a and the front screen 18a, and a phase plate 92 is disposed between the third projector 20c and the reflective mirror member 36. Therefore, it is possible to adjust all the linearly polarized light components of the image projected onto each of the screens 18a, 18b and 18c, and the problem of color shading is solved.

As the mode of disposing the phase plates 90 and 92, there are the following modes, in addition to the above-mentioned. For example, when it is assumed that an image of linearly polarized light is emitted from each of the projectors 20a, 20b and 20c, in the first projection system 30 the image of the linear polarized light, for example, is projected from the first projector 20a directly onto the screen 18a, whereas the images of linearly polarized light, for example, emitted from the second and third projectors 20b and 20c are once reflected by the reflective mirror members 32 and 36 to be images of elliptically polarized light, for example, and the images of the elliptically polarized light are projected onto the side screen 18b and the floor screen 18c, respectively.

When a 3-dimensional image is formed under this condition, the harmony of polarized light components may not be secured, and color shading may occur.

Figure 9A:
FIGS. 9A to 9C are illustrations of an example in which a phase plate is disposed in a first projection system.
Figure 9B:
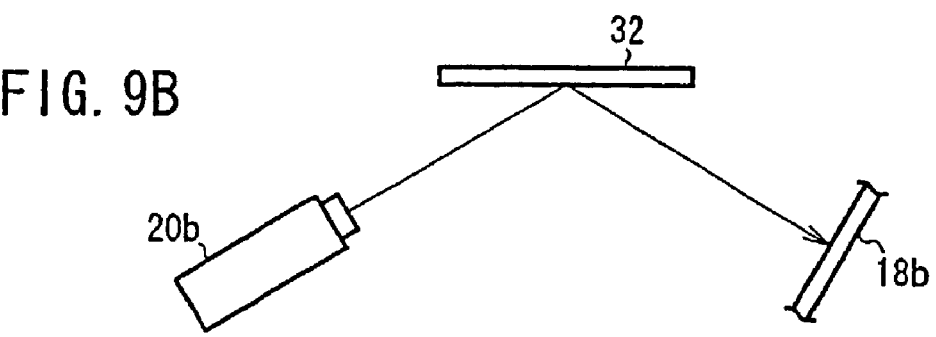
Figure 9C:
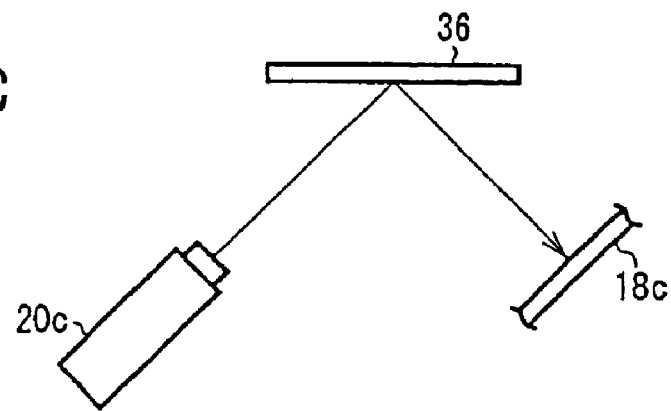

In view of this, the phase plate 90 and/or 92 is disposed in the first projection system 30 or the second projection system 34. As shown in FIGS. 9A to 9C, the phase plate 90 for converting, for example, linearly polarized light emitted from the first projector 20a into elliptically polarized light may be arranged, for example, in the first projection system 30, whereby the harmony of the polarized light components is secured and the problem of color shading is solved.

Figure 10A:
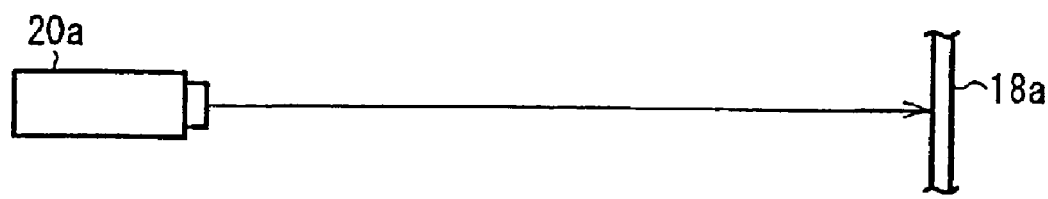
FIGS. 10A to 10C are illustrations of examples in which a phase plate is disposed between second and third projectors and each reflective mirror member.
Figure 10B:
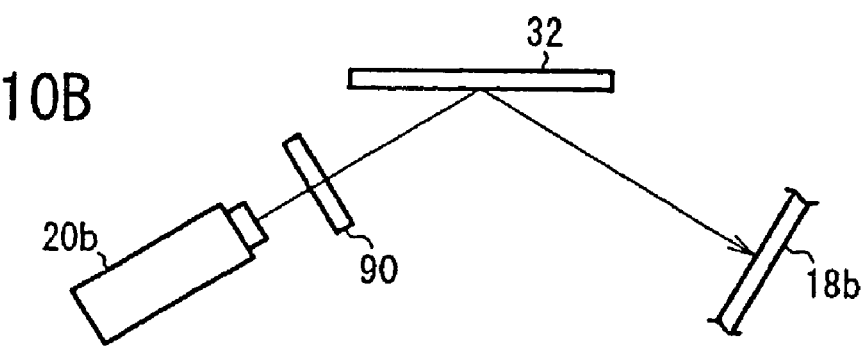
Figure 10C:
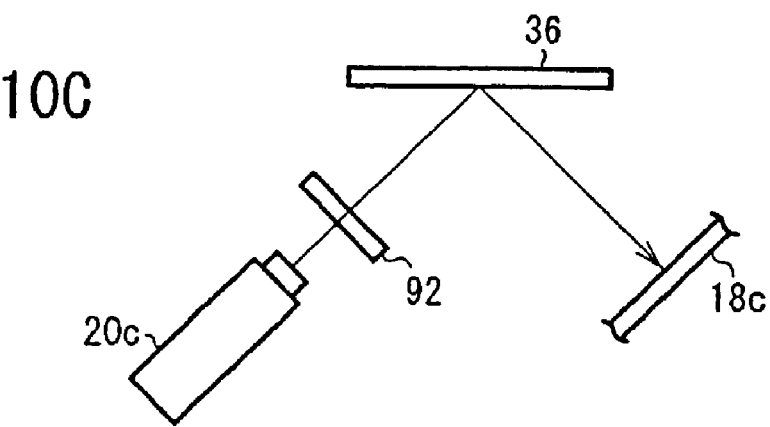
Figure 11A:
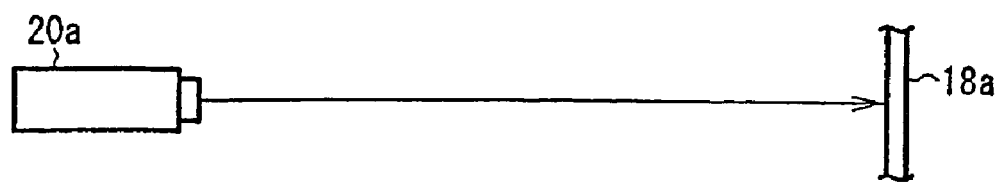
FIGS. 11A to 11C are illustrations of examples in which a phase plate is disposed between each reflective mirror member and side and floor screens.
Figure 11B:
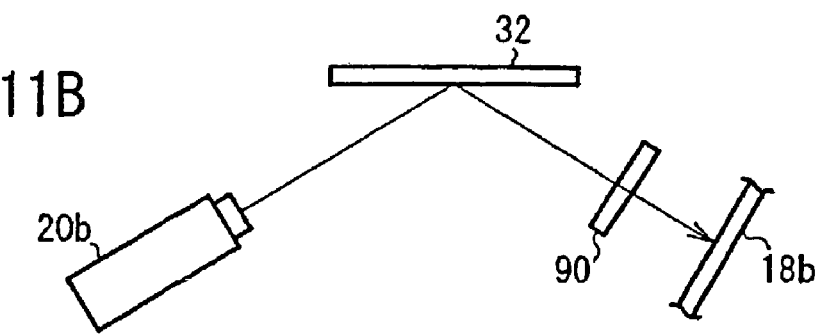
Figure 11C:
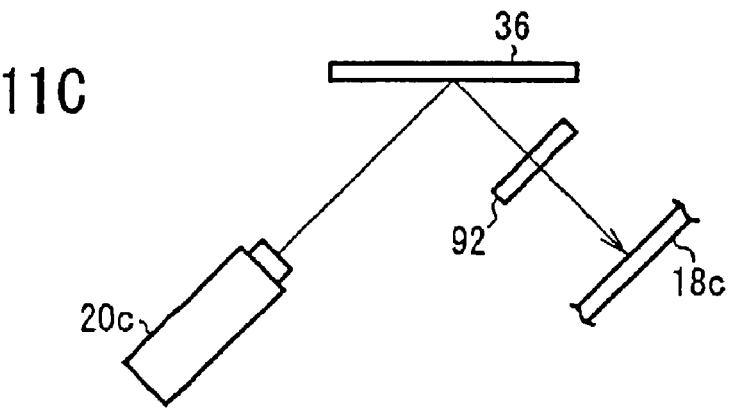

On the other hand, where the phase plates 90 and 92 are arranged in the second projection systems 34, it may be considered to arrange the phase plates 90 and 92 respectively between the second and third projectors 20b and 20c and the reflective mirror members 32 and 36, as shown in FIGS. 10A to 10C, or to arrange the phase plates 90 and 92 respectively between the reflective mirror members 32 and 36 and the side and floor screens 18b and 18c, as shown in FIGS. 11A to 11C.

Where the phase plates 90 and 92 are arranged respectively between the second and third projectors 20b and 20c and the reflective mirror members 32 and 36, as shown in FIGS. 10A to 10C, it is preferable to arrange such phase plates that the image light transmitted through the phase plates 90 and 92 is converted into linearly polarized light by the reflective mirror members 32 and 36.

Where the phase plates 90 and 92 are arranged respectively between the reflective mirror members 32 and 36 and the side and floor screens 18b and 18c, as shown in FIGS. 11A to 11C, it is preferable to arrange such phase plates that the image light of elliptically polarized light reflected by the reflective mirror members 32 and 36 is converted into linearly polarized light.

It should be noted here that when an image of linearly polarized light is projected onto each of the screens 18a, 18b and 18c to form a 3-dimensional image, a feeling of looking at a real vehicle (designed product) is not obtained but a feeling of looking at a model is obtained. Therefore, it is preferable to project an image of elliptically polarized light onto each of the screens 18a, 18b and 18c to form a 3-dimensional image. Namely, it is preferable to arrange the phase plate 90 between the first projector 20a and the front screen 18a and to arrange the phase plate 92 between the third projector 20c and the floor screen 18c, as shown in FIGS. 8A to 8C.

Thus, in the 3-dimensional image display device 10 according to the present embodiment, the reflective mirror members 32 and 36 are present respectively between the second projector 20b and the side screen 18b and between the third projector 20c and the floor screen 18c; therefore, it is possible, for example, to dispose the second and third projectors 20b and 20c in the vicinity of the front screen 18a and the side screen 18b, respectively.

Namely, since it is possible to earn the virtual distance of optical path by reflecting the light emitted from the second and third projectors 20b and 20c by the reflective mirror members 32 and 36 and projecting the reflected light onto each of the screens 18b and 18c, it is possible to project the image onto substantially the whole region of the side screen 18b and the floor screen 18c even if the second and third projectors 20b and 20c are disposed in the vicinity of the front and side screens 18a and 18b, respectively.

Figure 12:
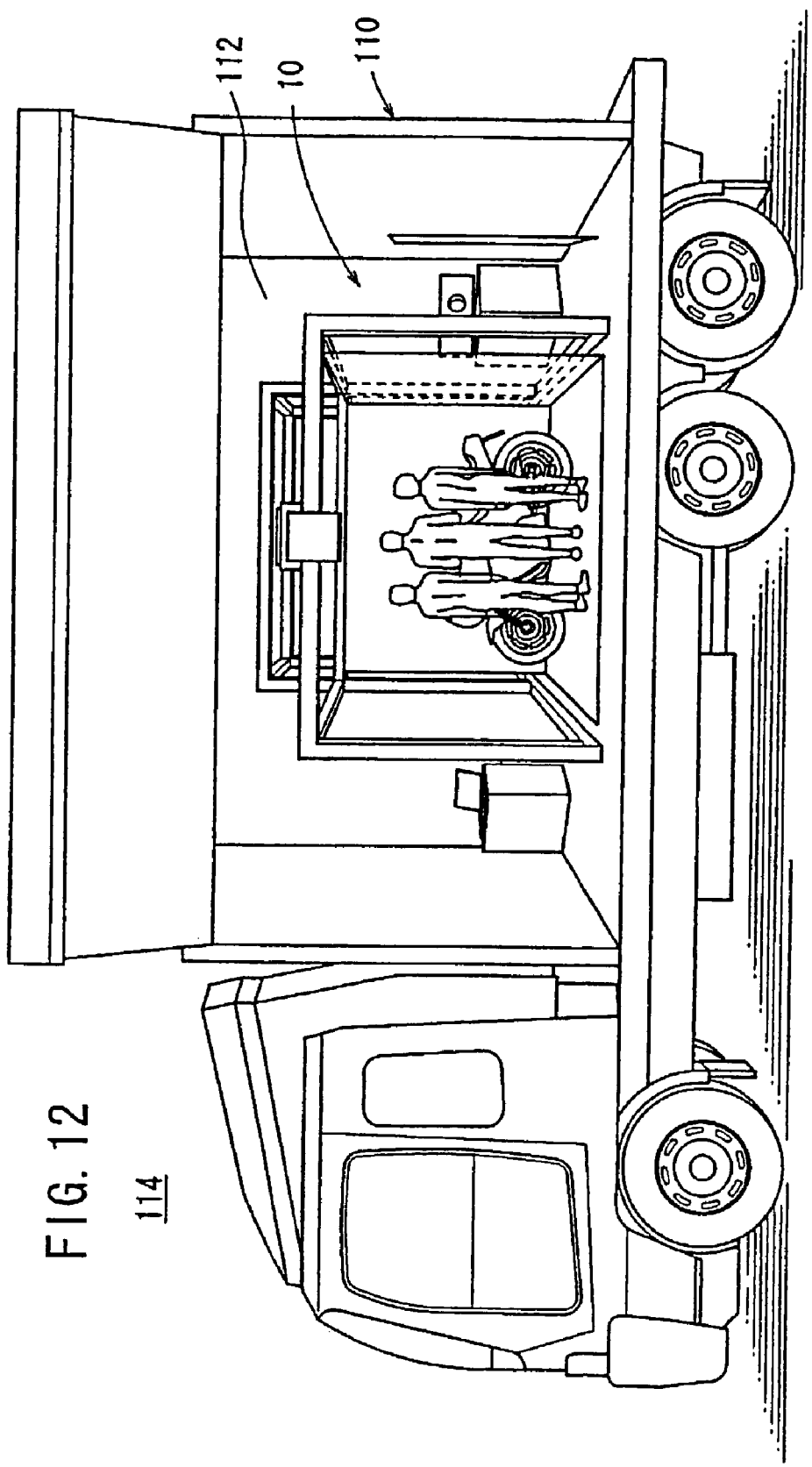
FIG. 12 is a front view of a 3-dimensional image display equipment according to one embodiment of the present invention.

This is advantageous for reducing the installation space of the three screens 18a to 18c and the three projectors 20a to 20c, as in this embodiment, whereby it is possible to reduce the size of a closed space in the case of installing the screens 18a to 18c and the projectors 20a to 20c in the closed space, for example. Therefore, as shown in FIG. 12, the 3-dimensional image display device 10 according to the present embodiment can be installed in a limited closed space 112 in a mobile body 110 such as a vehicle, thereby constituting a 3-dimensional image display equipment 114 according to the present embodiment comprised of the 3-dimensional image display device 10 and the mobile body 110.

In the 3-dimensional image display equipment 114 according to this embodiment, the 3-dimensional image display device 10 capable of producing a 3-dimensional image can be contained in the closed space 112 in the mobile body 110 and be transported, so that in the case of, for example, performing evaluation or presentation of a model at a designing stage by use of a 3-dimensional image, the evaluation or presentation can be conducted in any place.

This has the merits that corrections at the designing stage of a product can be conducted early and that building of design specifications taking the opinions of the users into account can be performed early. In addition, a demonstration can be conducted at a site where the commercial product is actually used, which is advantageous for enhancing the customer attractiveness of the commercial product and the customer's interest in the commercial product.

While the embodiments of the 3-dimensional image display device and the 3-dimensional image display equipment have been described above, the 3-dimensional image display device and the 3-dimensional image display equipment are not limited to the embodiments, and various constitutions can be adopted without departing from the gist of the present invention.

Thus, according to the 3-dimensional image display device according to the present invention, it is possible to contrive a reduction in the overall size of the device in the case of arranging at least two screens, to reduce color shading of a 3-dimensional image, and to give a further absorbedness feeling to the viewer.

According to the 3-dimensional image display equipment according to the present invention, it is possible to produce a 3-dimensional image in a limited space in a mobile body such as a vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A 3-dimensional image display device comprising:
   a frame surrounding a viewing space;
   a projector-installing frame disposed behind the frame surrounding the viewing space;
   at least a first, second, and third image projector;
   at least a first, second, and third screen disposed within the frame, each of the screens having an inside surface facing the viewing space and an outside surface facing away from the viewing space, said first and second image projectors for projecting images onto the outside surfaces of said first and second screens respectively, and the third image projector for projecting images through the viewing space and onto the inside surface of said third screen;
   a controller for outputting image data for a 3-dimensional display according, respectively, from said first, second, and third image projectors to said first, second, and third screens;
   wherein the first projector is disposed behind one side of the projector-installing frame, and the third projector is fixed inside the projector-installing frame disposed behind the frame,
   wherein the images from said first image projector are projected through the projector-installing frame and directly onto said first screen; the images from said second image projector are projected onto said second screen through reflection by a reflective member disposed outside of the frame, and the images from said third image projector fixed inside the projector-installing frame are projected onto said third screen through reflection by another reflective member, and
   wherein at least one set of said image projectors and said screens includes a polarizing means for polarizing light, said polarizing means being disposed between said image projector and said screen.

2. The 3-dimensional image display device as set forth in claim 1, wherein said polarizing means is disposed between said first image projector and said first screen.

3. The 3-dimensional image display device as set forth in claim 1, wherein said polarizing means is disposed between said second image projector and said second screen.

4. The 3-dimensional image display device as set forth in claim 1, wherein said controller outputs image data for a 3-dimensional display according to the positions of said screens and a viewer.

5. A 3-dimensional image display device, comprising:
   a frame surrounding a viewing space;
   a projector-installing frame disposed behind the frame surrounding the viewing space;
   at least a first, second, and third image projector;
   at least a first, second, and third screen disposed within the frame, each of the screens having an inside surface facing the viewing space and an outside surface facing away from the viewing space, said first and second image projectors for projecting images onto the outside surfaces of said first and second screens respectively, and the third image projector for projecting images through the viewing space and onto the inside surface of said third screen;
   a controller for outputting image data for a 3-dimensional display according, respectively, from said first, second, and third image projectors to said first, second, and third screens;
   wherein the first projector is disposed behind one side of the projector-installing frame, and the third projector is fixed inside the projector-installing frame disposed behind the frame,
   wherein the images from said first image projector are projected through the projector-installing frame and directly onto said first screen: the images from said second image projector are projected onto said second screen through reflection by a reflective member disposed outside of the frame, and the images from said third image projector fixed inside the projector-installing frame are projected onto said third screen through reflection by another reflective member, and
   wherein at least one set of said image projectors and said screens includes a polarizing means for polarizing light, said polarizing means being disposed between said image projector and said screen,
   the first and third projectors being disposed behind a same side of the frame surrounding the viewing space.

6. The 3-dimensional image display device as set forth in claim 1, wherein the another reflective member is fixed to the projector-installing frame at a predetermined angle.

7. The 3-dimensional image display device as set forth in claim 1, and further including liquid crystal shutter spectacles adapted to be worn by a viewer for perceiving said 3-dimensional image.

8. The 3-dimensional image display device as set forth in claim 7, and further including a magnetic field generator operatively disposed relative to said first and second screens for generating a magnetic field and a magnetic-type position sensor operatively disposed within said liquid crystal shutter spectacles for outputting a position of a viewer relative to said first and second screens.

9. The 3-dimensional image display device as set forth in claim 1, wherein the third screen is a flat floor screen upon which viewers stand, and
   wherein the another reflective member is mounted above the flat floor screen so that said third image projector fixed inside the projector-installing frame is capable of projecting the images through the viewing space and onto the inside surface of the flat floor screen.

10. The 3-dimensional image display device as set forth in claim 9, wherein said polarizing means polarizes the light projected from said third image projector, said polarizing means being disposed between the third image projector and the third screen.

11. A 3-dimensional image display equipment comprising:
a mobile body having a closed space;
a 3-dimensional image display device having frame installed in said closed space of said mobile body, the frame surrounding a viewing space;
a projector-installing frame disposed behind the frame surrounding the viewing space,
at least a first, second, and third image projector;
at least a first, second and third screen disposed within the frame, each of the screens having an inside surface facing the viewing space and an outside surface facing away from the viewing space, said first and second image projectors for projecting images onto the outside surfaces of said first and second screens, respectively, and the third image projector for projecting images through the viewing space and onto the inside surface of said third screen;
a controller for outputting image data for a 3-dimensional display, the image data adjusted to a left and a right eye of a viewer according, respectively, from said first and second image projectors to said first and second screens;
wherein the first projector is disposed behind one side of the projector-installing frame, and the third projector is fixed inside the projector-installing frame disposed behind the frame,
wherein the images from said first image projector are projected through the projector-installing frame and directly onto said first screen; the images from said second image projector are projected onto said second screen through reflection by a reflective member disposed outside of the frame, and the images from said third image projector fixed inside the projector-installing frame are projected onto said third screen through reflection by another reflective member, and
wherein at least one set of said image projectors and said screens includes a polarizing means for polarizing light, said polarizing means being disposed between said image projector and said screen.

12. The 3-dimensional image display equipment as set forth in claim 11, wherein said polarizing means is disposed between said first image projector and said first screen.

13. The 3-dimensional image display equipment as set forth in claim 11, wherein the another reflective member is fixed to the projector-installing frame at a predetermined angle.

14. The 3-dimensional image display equipment as set forth in claim 11, wherein said controller outputs the image data for the 3-dimensional display according to the positions of said screens and the viewer.

15. The 3-dimensional image display equipment as set forth in claim 11, the first and third projectors being disposed behind a same side of the frame surrounding the viewing space.

16. The 3-dimensional image display equipment as set forth in claim 13, wherein said controller outputs the image data for the 3-dimensional display according to the positions of said screens and the viewer.

17. A 3-dimensional image display device, comprising:
a frame surrounding a viewing space within which a viewer is positioned;
a projector-installing frame disposed behind the frame surrounding the viewing space;
at least a first, second, and third image projector;
at least a first, second, and third screen disposed within the frame and correspondingly to said first, second, and third image projectors, said first, second, and third projectors for projecting first, second, and third images, respectively, onto the first, second, and third screens;
a controller for outputting image data for a 3-dimensional display, the image data adjusted to a left and a right eye of a viewer according, respectively, from said first and second image projectors to said first and second screens;
wherein the first projector is disposed behind one side of the projector-installing frame, and the third projector is fixed inside the projector-installing frame disposed behind the frame,
wherein the first image from said first image projector is projected through the projector-installing frame and directly onto said first screen; the second image from said second image projector is projected onto said second screen through reflection by a reflective member disposed outside of the frame, and the third image from said third image projector fixed inside the projector-installing frame is projected onto said third screen through reflection by another reflective member;
the 3-dimensional display device further comprising:
liquid crystal shutter spectacles adapted to be worm by the viewer for perceiving a 3-dimensional image;
a magnetic field generator operatively disposed on an upper cross beam of the frame above the viewing space for generating a magnetic field; and
a magnetic-type position sensor operatively disposed within said liquid crystal shutter spectacles for outputting a position of the viewer relative to said first and second screens,
wherein each of the three screens includes an inside surface facing the viewing space and an outside surface facing away from the viewing space.

18. The 3-dimensional image display equipment as set forth in claim 17, wherein the another reflective member is arranged at a ceiling portion of the viewing space so that an image from the third image projector is projected onto the third screen,
wherein said polarizing means polarizes the light projected from said third image projector, said polarizing means being disposed between the third image projector and the another reflective member.

19. The 3-dimensional image display equipment as set forth in claim 11,
wherein the third screen is a flat floor screen upon which viewers stand, and
wherein the another reflective member is mounted above the flat floor screen so that said third image projector fixed inside the projector-installing frame is capable of projecting the images through the viewing space and onto the inside surface of the flat floor screen.

20. The 3-dimensional image display equipment as set forth in claim 19, wherein said polarizing means polarizes the light projected from said third image projector, said polarizing means being disposed between the third image projector and the third screen.

21. The 3-dimensional image display device as set forth in claim 1, wherein the second screen and the third screen, each of which receives the images thorough reflection, are arranged substantially orthogonally to each other.

22. The 3-dimensional image display device as set forth in claim 17, wherein the another reflective member is mounted above the flat floor screen so that said third image projector fixed inside the projector-installing frame is capable of projecting the images through the viewing space and onto the inside surface of the flat floor screen.

23. The 3-dimensional image display device as set forth in claim 17, wherein the another reflective member is fixed to the projector-installing frame at a predetermined angle, and the reflective member outside of the frame and the another reflective member reflect the second and third images, respectively, onto the second screen and the third screen, and wherein the third screen on which the third images are projected is a flat floor screen, and the third screen is substantially orthogonal to the second screen.

24. The 3-dimensional image display device as set forth in claim 1, wherein the another reflective member is disposed at the ceiling position of the viewing space, and the third screen is a flat floor screen at a bottom of the frame upon which viewers stand, and wherein the images projected from the third projector pass downwardly from the ceiling portion, through the viewing space, and to the flat floor screen at the bottom of the frame.

25. The 3-dimensional image display device as set forth in claim 1, wherein the polarizing means includes a phase plate arranged between the first image projector and the first screen, wherein linearly polarized light of the images projected from the first image projector through the phase plate onto said first screen is converted into elliptically polarized light, while the linearly polarized light of images emitted from the second image projector is reflected by the reflective member onto the second screen, and wherein the images projected onto each of the first, second, and third screens are elliptically polarized.

26. The 3-dimensional image display device as set forth in claim 1, wherein the polarizing means includes a phase plate arranged between the second image projector and the second screen, wherein linearly polarized light of the images emitted from the first image projector is projected directly onto said first screen, while the images from emitted from the second image projector, which are reflected by the reflective member onto the second screen, are converted to linear polarization by the phase plate, wherein the images projected onto each of the first, second, and third screens are linearly polarized.

* * * * *